*H. Sheets,*
*Riding Saddle,*
*№ 157,*   *Patented Mar. 30, 1837.*
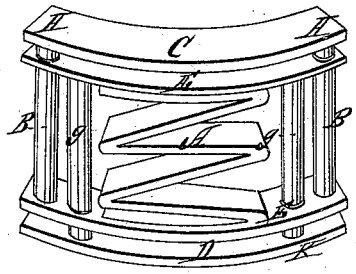

UNITED STATES PATENT OFFICE.

HENRY SHEETS, OF STAUNTON, VIRGINIA.

SPRING FOR SPRING-SEAT SADDLES.

Specification of Letters Patent No. 157, dated March 30, 1837.

*To all whom it may concern:*

Be it known that I, HENRY SHEETS, of Staunton, in the county of Augusta and State of Virginia, have invented a new and useful Improvement in Saddle-Springs Designed for the Ease and Comfort of Horse and Rider; and I do hereby declare that the following is a true and exact description.

The nature of my invention consists in confining a zigzag spring A in an iron frame the exterior sides B of the frame being round. Iron side pieces or slides the tops H of which are riveted to the top C of the frame, which is a flat piece of iron about one fourth part of an inch broad, then passing through holes drilled in each end of an iron cross bar E, of the same breadth of the top of the frame and which is placed immediately under the top piece of the frame; the bottom of the said side pieces or slides are riveted to another iron cross bar F which is immediately over the bottom of the frame; the interior or inner round iron side pieces J, or slides like those first named are riveted K, to the bottom D, of the frame and passing through a hole drilled in each end of an iron cross bar which as above said is immediately over the bottom of the frame; the other ends are riveted to the iron cross bar placed as above stated under the frame. The action of the zigzag spring confined and kept in place by the machinery above described is produced by passing a part of the webbing upon which the saddle is strained between the top of the frame and the iron cross bar immediately under and parallel with it and confining it to the pommel of the saddle, and then passing another part of the webbing between the bottom of the frame and the iron cross bar placed immediately above and parallel with it and confining it (the webbing) to the cantle of the saddle, so that the least motion produced by pressure on the saddle sets the spring in action or in other words any pressure upon any part of the machine puts the whole in motion. The advantage which the above described spring has over all others in use is the great strength and permanency combined with elasticity of the zigzag spring secured to it by machinery regulating the action of the spring occupying but little space and being easy of construction and durable.

I do not claim the zigzag spring as my invention but—

What I do claim as mine and desire to secure by Letters Patent is—

The improvement produced by the invention and application in the mode above described of the double sliding frame regulating the action of the spring.

HENRY SHEETS.

Witnesses:
CHESLEY KINNEY,
JAS. F. PATTERSON.